(12) United States Patent
Wang et al.

(10) Patent No.: US 9,807,000 B2
(45) Date of Patent: Oct. 31, 2017

(54) METHOD FOR CONSTITUTING HYBRID NETWORK SPANNING TREES, METHOD OF REDUNDANCY, AND CONTROL SYSTEM THEREOF

(71) Applicants: ESTINET TECHNOLOGIES INC., Hsinchu (TW); NATIONAL CHIAO TUNG UNIVERSITY, Hsinchu (TW)

(72) Inventors: Shie-Yuan Wang, Hsinchu (TW); Chia-Cheng Wu, Taichung (TW)

(73) Assignees: ESTINET TECHNOLOGIES INC., Hsinchu (TW); NATIONAL CHIAO TUNG UNIVERSITY, Hsinchu (TW)

( * ) Notice: Subject to any disclaimer, the term of this patent is extended or adjusted under 35 U.S.C. 154(b) by 133 days.

(21) Appl. No.: 14/878,693

(22) Filed: Oct. 8, 2015

(65) Prior Publication Data
US 2017/0005919 A1    Jan. 5, 2017

(30) Foreign Application Priority Data
Jul. 3, 2015    (TW) .............................. 104121656 A

(51) Int. Cl.
| H04L 12/28 | (2006.01) |
| H04L 12/753 | (2013.01) |
| H04L 12/751 | (2013.01) |
| H04L 12/64 | (2006.01) |
| H04L 12/715 | (2013.01) |
| H04L 12/721 | (2013.01) |
| H04L 12/707 | (2013.01) |

(52) U.S. Cl.
CPC .............. *H04L 45/48* (2013.01); *H04L 12/64* (2013.01); *H04L 45/02* (2013.01); *H04L 45/123* (2013.01); *H04L 45/22* (2013.01); *H04L 45/64* (2013.01); *Y02B 60/43* (2013.01)

(58) Field of Classification Search
CPC ......... H04L 45/48; H04L 12/64; H04L 45/64; H04L 45/22; H04L 45/123; H04L 45/02
See application file for complete search history.

(56) References Cited

U.S. PATENT DOCUMENTS

| 9,450,817 B1* | 9/2016 | Bahadur ............. H04L 41/0806 |
| 2014/0099119 A1* | 4/2014 | Wei ..................... H04J 14/0257 398/79 |

(Continued)

*Primary Examiner* — Clemence Han
(74) *Attorney, Agent, or Firm* — Li&Cai Intellectual Property (USA) Office

(57) ABSTRACT

The disclosure is related to a method for constructing hybrid network spanning trees, a method of redundancy, and a control system thereof. The method and system are adapted to a hybrid network system including at least one software-defined network (SDN) and at least one non-SDN network. In the method, a controller of the SDN is employed to collect network packets over the hybrid network. After analyzing the information carried in the network packets, the information relating to the topology can be obtained. Therefore, all the possible spanning trees can be constituted according to the topology. As well, the path delay and path bandwidth respectively for the SDN and non-SDN can also be obtained. The information allows the system to render utility function for every spanning tree. The most suitable spanning tree over the hybrid network system is applied. A mechanism of redundancy is also provided.

15 Claims, 9 Drawing Sheets

(56) References Cited

U.S. PATENT DOCUMENTS

| | | | |
|---|---|---|---|
| 2014/0241366 A1* | 8/2014 | Smith | H04L 45/24 370/392 |
| 2015/0222491 A1* | 8/2015 | Clark | H04L 45/48 370/256 |
| 2016/0057054 A1* | 2/2016 | Lumezanu | H04L 45/48 370/256 |
| 2017/0099211 A1* | 4/2017 | Iovanna | H04L 45/02 |

* cited by examiner

METHOD FOR CONSTITUTING HYBRID NETWORK SPANNING TREES, METHOD OF REDUNDANCY, AND CONTROL SYSTEM THEREOF

BACKGROUND

1. Technical Field

The present invention is related to a method for constructing spanning trees, a method of redundancy, and a system; in particular to the method for constructing optimal spanning trees in real time for a hybrid network system when abnormal condition occurs within the network system, and also to the method of redundancy and the control system.

2. Description of Related Art

Software-Defined Networks (SDN) is a next generation network architecture that incorporates a centralized controller to act as a control plane of the switches of a traditional distributed network system. The architecture of the software-defined network allows the switches in the network to process the traditional data plane since the control plane is at the controller. The centralized controller provides the optimized control for the system.

The centralized architecture of software-defined network implements topology optimization and renders better routings by the controller. The communication between the controller and switches is made through standard and open protocols such as the OpenFlow protocol. The OpenFlow protocol allows the manufacturers to develop the compatible devices rather than using their own standards. The standardized architecture allows the network administrator to program or optimize applications of the controller due to the practical need. Therefore, the multi-functional application modules can be provided.

Thus, software-defined network is powerful and advantageous to the network development, and is able to dominate the future network systems. However, it is difficult to make SDN switches substitute for all the legacy network switches within a short period of time when the SDNs want to replace the legacy networks. The software-defined network may not be widespread so soon because the SDN switches are expensive and test for the substation requires great time. The centralized mechanism of management for the software-defined network may limit its network scale. Therefore, it requires a transition period for adjustment when the SDNs progressively substitute for the legacy networks. In the transition period, both the software-defined networks and the legacy networks coexist in a hybrid network.

In the hybrid network, the tangible network topology may exist loops due to fault tolerance is provided. The loops in the network may cause the notorious packet broadcast storm that will result in serious problem. Therefore, a spanning tree protocol is required to solve the packet broadcast storm problem. However, since the spanning tree protocol adapted to the software-defined network is not compatible to the spanning tree used in the legacy network, the spanning tree protocol for the legacy network does not function within the software-defined network. It is impossible to provide an overall spanning tree protocol over the topology of the hybrid network. The packet broadcast storm may still cause the problem in the loops of the hybrid network.

SUMMARY

For solving the problem of packet broadcast storm formed as connecting heterogeneous networks in the hybrid network, and providing management mechanism of the spanning trees, the disclosure is to provide a method for constructing spanning trees over hybrid network, method of redundancy, and a system thereof. The method and system are applicable to the hybrid network having at least one software-defined network and at least one non-SDN.

According to one aspect of the invention, in the method for constructing the hybrid network spanning trees, a controller of the software-defined network is utilized to collect network packets from both the SDN and the non-SDN. This hybrid network includes at least one node of SDN, and the node is connected with at least one node of the non-SDN. Next, the information of topology of the hybrid network can be obtained as resolving the identification data from the network packets. Therefore a virtual network topology can be created.

After that, the information of path delay and path bandwidth of the network for both SDN and non-SDN is obtained. The information is referred to when constructing all or part of the spanning trees for the hybrid network. Every spanning tree essentially attributes an average all-pair path delay and all-pair path bandwidth. A corresponding value with respect to every spanning tree is generated.

In another aspect, in the method, the OpenFlow protocol is incorporated in the software-defined network to collect information of topology of the software-defined network, further including information to the path delay and path bandwidth over every path. For the non-SDN, network packets of Bridge Protocol Data Unit (BPDU) issued by the traditional switch are referred to infer the spanning tree. The controller of SDN resolves identification information from the network packets of BPDU, and accordingly investigates the connections between the network sections of both the SDN and non-SDN. The controller also obtains the topology information of SDN. A whole topology for the hybrid network is generated.

Further, in a method of redundancy incorporating the method for constructing hybrid network spanning trees, it is firstly to sort the spanning trees based on the values corresponding to the spanning trees. When any abnormal condition occurs by detecting the network packets of the hybrid network, the sorting is referred to switch to the next spanning tree.

In a control system for the hybrid network, a packet acquiring module is one of the primary function modules and used to collect network packets from both SDN and non-SDN; a packet analyzing module is used to analyze the network packets obtained from the packet acquiring module so as to obtain the identification and path information; a topology establishing module is used to establish the topology for the hybrid network based on the information of topology obtained from the identification information retrieved by analyzing the network packets; and a spanning-tree construction module is used to estimate an average all-pair path delay and an average all-pair path bandwidth for every spanning tree in the hybrid network system. Every spanning tree has its corresponding value.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1A:
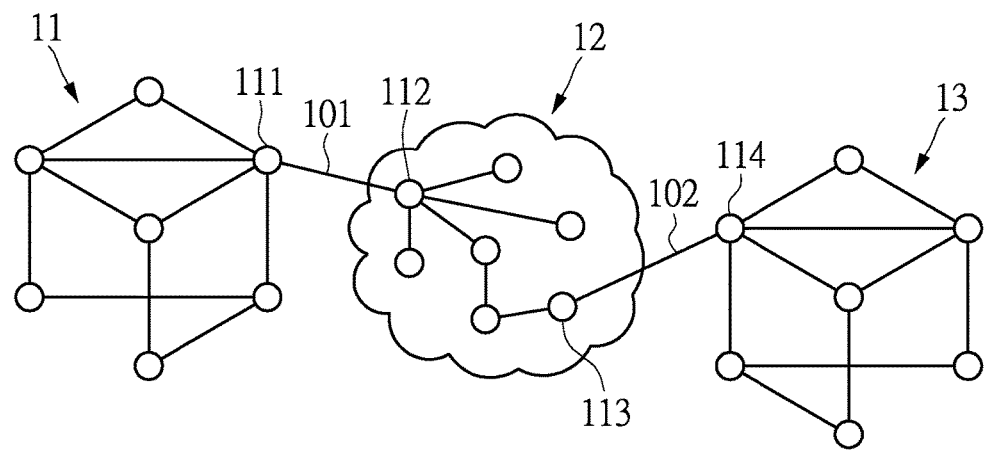
FIG. 1A shows a schematic diagram depicting a hybrid network system composed of SDN and the legacy network in one embodiment of the present invention.

Reference will now be made in detail to the exemplary embodiments of the present disclosure, examples of which are illustrated in the accompanying drawings. Wherever possible, the same reference numbers are used in the drawings and the description to refer to the same or like parts.

Before the software-defined networks (SDN) completely replace the traditional networks, i.e. non-SDN, a transitional period of time may be required during which the software-defined networks and the traditional networks need to co-exist. However, the mechanisms to construct spanning trees for the SDN and for the non-SDN respectively are different. That means the communication protocol adapted to constructing spanning trees for the non-SDN traditional network is inapplicable to the SDN and cannot solve the packet broadcast storm problem formed in the loop of the hybrid physical network topology. The present invention relates to the method for reconstructing the spanning tree instantaneously once any abnormal condition occurs, the method of redundancy, and their control system, and is also provided for a solution to solve the broadcast storm problem.

According to one embodiment in the disclosure of the present invention, the method for constructing spanning trees for a hybrid network is applicable to a network system combining two interconnected heterogeneous networks. The two different network systems are such as the software-defined network, hereinafter 'SDN' and others hereinafter 'non-SDN'. A control system of the SDN is able to collect the network packets from the various network sections, and construct new spanning tree after analyzing the information relating to the network packets. Accordingly, the new spanning tree solves the broadcast storm problem over the heterogeneous networks by disabling the redundant network links.

Reference is made to FIG. 1A showing a schematic diagram depicting the hybrid network combining the SDNs (11, 13) and the non-SDN (12) according to one embodiment of the present invention. In the diagram, a first SDN 11 is shown to have a network connection 101 to connect the non-SDN tradition network 12. The network connection 101 bridges the nodes 111 and 112 respectively within two network sections. A second SDN 13 is connected with the traditional network 12 over another network connection 102 using the two respective nodes 113 and 114. Thus, the topology formed over the two networks can successfully work without resulting in the packet broadcast storm problem.

Figure 1B:
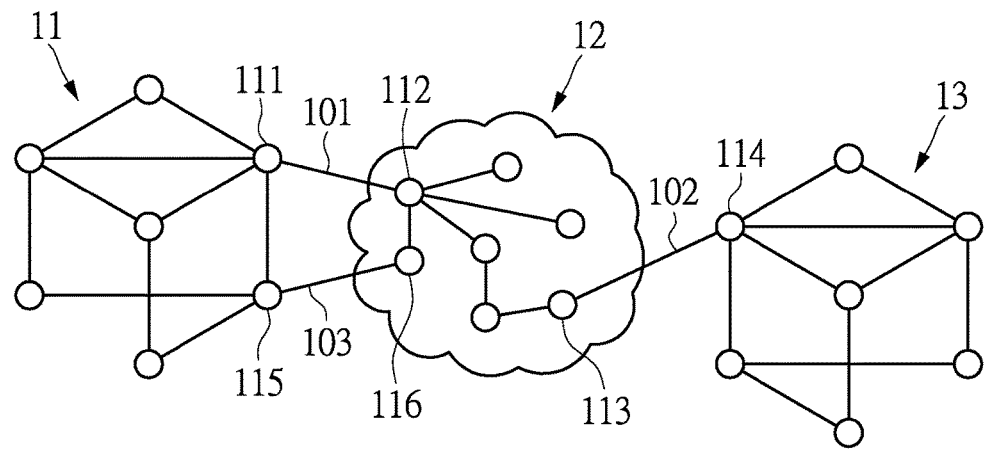
FIG. 1B shows a schematic diagram depicting the hybrid network system in one further embodiment of the present invention.

FIG. 1B shows another type of the network system. In addition to the mentioned system combining the first SDN 11 and the traditional network 12 using the connection 101, another network connection 103 is used to link the nodes 115 and 116 respectively in the first SDN 11 and the traditional network 12. Thus, the connections 101 and 103 may induce the packet broadcast storm problem between the two network sections 11 and 12, and there is no way to avoid the packet broadcast storm problem under the conventional mechanism.

Figure 1C:
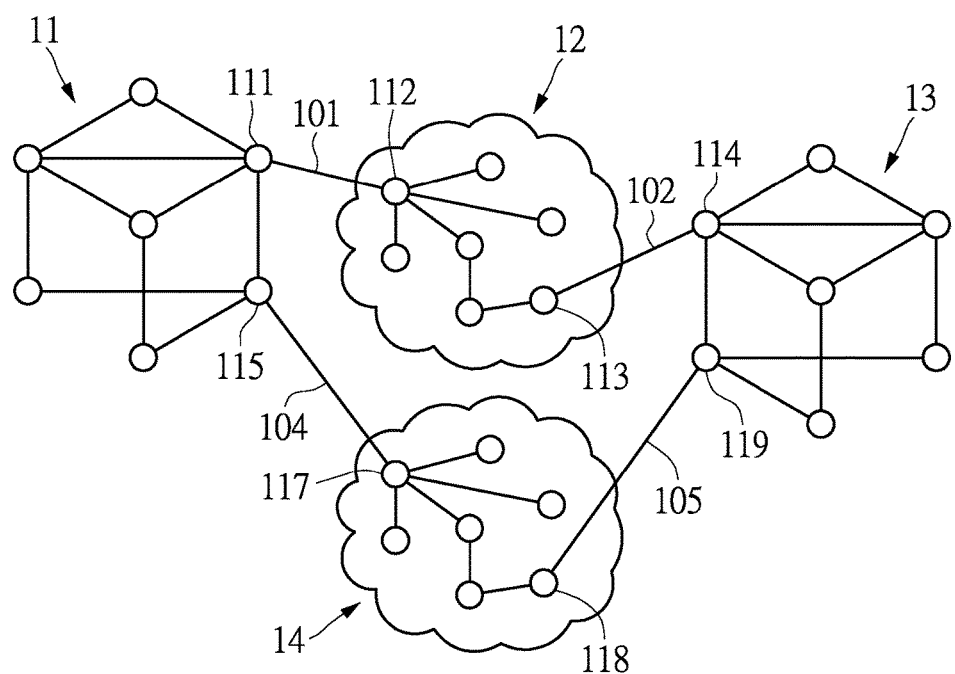
FIG. 1C shows a schematic diagram depicting the hybrid network system according to one another embodiment of the present invention.

In one further embodiment, as shown in FIG. 1C, the hybrid network includes two traditional networks 12 and 14 in between the mentioned first SDN 11 and the second SDN 13. This more complex network system includes more network connections that may easily form the loops without intent. The possible network loops among the network sections may cause the packet broadcast storm problem.

Further, as shown in FIG. 1C, no network loop forms over the network connections 101 and 102 among the first SDN 11, the traditional network 12, and the second SDN 13. When a traditional network 14 is added and interconnected with two SDNs 11 and 13, a network connection 104 is therefore established between a node 115 of the first SDN 11 and a node 117 of the non-SDN traditional network 14. One the other end, another network connection 105 is formed between a node 118 of the traditional network 14 and a node 119 of the second SDN 13. Those network connections 101, 102, 104 and 105 on this topology form a loop. Even though there is no loop formed within each network section, the whole network system now forms a loop that may induce the packet broadcast storm problem. The packet broadcast storm problem may not be avoided since the broadcast network packets in the loop may still continue to loop over the whole topology.

With respect to the above-mentioned topologies that possibly form the network loops; the method for constructing hybrid network spanning trees is described in the disclosure. One of the objectives of the method is to construct a spanning tree for the hybrid network. In one embodiment, the spanning tree may be configured by an administrator. The spanning tree may be modified by the administrator who customizes the spanning tree based on the administrator's preference on the average path bandwidth or the average path delay.

Figure 2A:
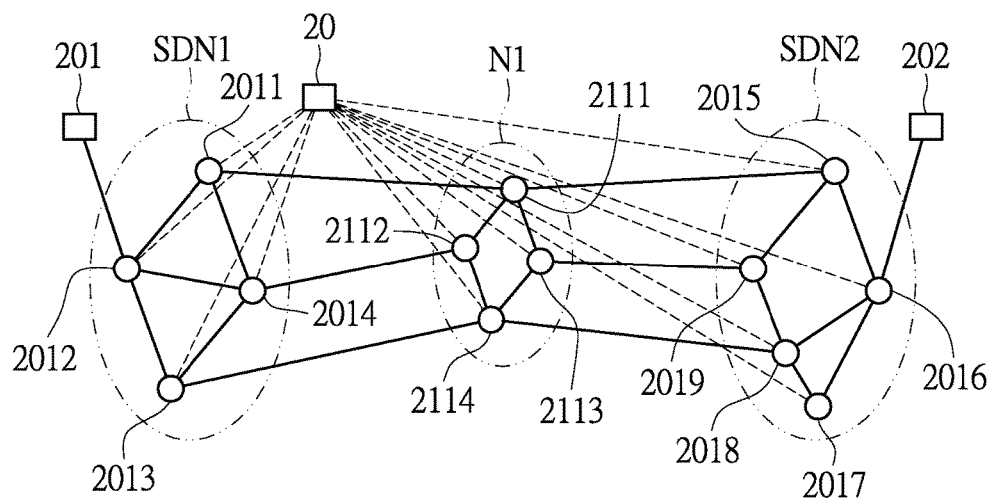
FIG. 2A schematically depicts the framework of the hybrid network in one embodiment of the present invention.

Reference next is made to FIG. 2A showing a schematic diagram depicting a framework of the hybrid network. The figure schematically shows a switch of SDN connected with another switch of non-SDN traditional network when the SDN1 and SDN2 interconnect with a traditional network N1. It is noted that the number of nodes and the topologies are not limited to the scope of the present invention.

The OpenFlow standard generally defines a communication protocol adopted by SDN, but fails to communicate with the traditional switch directly. Therefore, in accordance with the present invention, the switch within the SDN firstly broadcasts network packets over the network, and retrieves information from the received responsive packets. When the broadcast packets enter the traditional network, the packet broadcast storm problem may be induced once any loop is formed between the SDN and non-SDN. In the method for constructing hybrid network spanning trees in accordance with the present invention, an algorithm may be introduced to find out the redundant connections and disable these redundant connections in order to remove the loops. Therefore, the packet broadcast storm problem can be prevented.

At the left side of the diagram of FIG. 2A, a software-defined network SDN1, hereinafter 'SDN1' is schematically shown; and the right side is another software-defined network SDN2, hereinafter 'SDN2'. Both software-defined networks SDN1 and SDN2 are connected with the intermediate traditional network N1. The circles shown within the network sections indicate the nodes such as switches. For example, the nodes 2011, 2012, 2013 and 2014 form the SDN1. The SDN2 is composed of the nodes 2015, 2016, 2017, 2018 and 2019. The traditional network N1 has the nodes 2111, 2112, 2113 and 2114. The software-defined networks SDN1 and SDN2 are characterized by using a controller 20 connecting to the multiple nodes 2011, 2012, 2013, 2014, 2015, 2016, 2017, 2018, and 2019 in the software-defined networks SDN1 and SDN2 over a centralized topology. However, the non-SDN traditional network N1 utilizes the mechanism of distributed management. Rather than the centralized management, the nodes, e.g. switches, in the traditional network N1 exchange their messages for constructing routing table and exchanging packets.

According to the figure, there are loops formed among the network sections (SDN1, SDN2, and N1). A large loop is also formed over the whole network topology. For example, a first terminal node 201 located at the left side of the diagram is connected with the node 2012 of the SDN1; and a second terminal node 202 is connected with the node 2016 of the SDN2. When the first terminal node 201 issues packets, e.g. a "ping" command, to the second terminal node 202, every node over this route for transferring the packets will re-generate broadcast packets under a specific network protocol, e.g. a learning bridge protocol. When these broadcast packets are generated, the simulation shows that the packet broadcast storm is instantaneously formed and almost damages the whole network system.

Figure 2B:
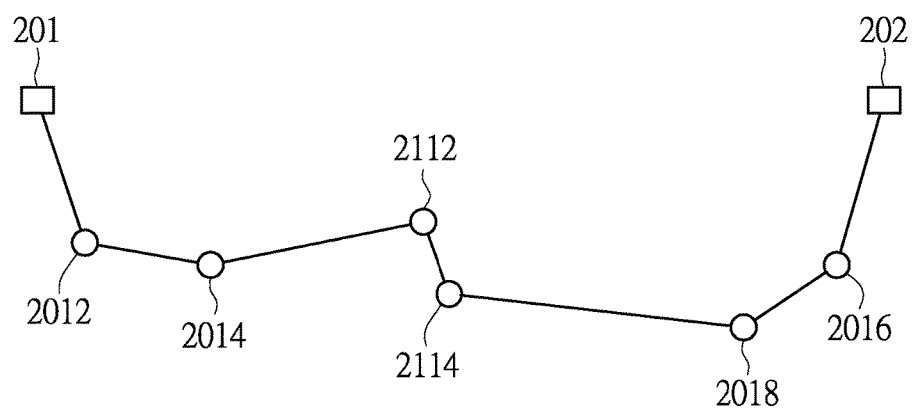
FIG. 2B shows a schematic diagram illustrating an exemplary spanning tree generated based on the topology of the hybrid network depicted in FIG. 2A.

Next, in FIG. 2B, when the method for constructing the hybrid network spanning tree is applied, the spanning tree constructed in the topology automatically removes the redundant routes and also destroys the loop. As FIG. 2B shows, the packets will be delivered to the destination over a single route, that is, over the nodes 2012, 2014, 2112, 2114, 2018, and 2016 in order as starting at the first terminal node 201 and ending at the second terminal node 202. Thus no packet broadcast storm will be formed and spread over the whole network.

Under this topology, it shows that alternative routes exist between the first terminal node 201 and the second terminal node 202. According to the method for constructing hybrid network spanning trees in accordance with the present invention, the controller 20 of SDN acquires the information relating to transmission delay and bandwidth from the network packets collected from network sections, and accordingly computes multiple spanning trees between the two terminal nodes 201 and 202. The spanning tree automatically removes the redundant routes between the two terminal nodes 201 and 202. Therefore, the packets can be efficiently delivered over the spanning tree, and avoids the packet broadcast storm problem. For example, the disabled network connections are such as the route between the node 2011 of SDN1 and the node 2111 of the traditional network N1; the route between the node 2013 of SDN1 and the node 2114 of the traditional network N1; the route between the node 2015 of SDN2 and the node 2111 of the traditional network N1; and the route between the node 2019 of SDN2 and the node 2113 of the traditional network N1.

In addition, since the network may suffer the situation of broken connection, in the method for constructing hybrid network spanning trees, a preferred alternate spanning tree can be prepared in advance for any possible broken connection. The method allows instantaneously switching to the alternate spanning tree when the switching is required. The network user will not be aware of the spanning tree switching. The process can be referred to the flow chart in FIG. 8.

According to the above-mentioned embodiments, the method of the present invention is to disable the redundant network connections, and as well to construct an optimized spanning tree over the topology combining the SDN and the non-SDN. The optimization of the spanning tree is based on the requirements of average path bandwidth and average path delay as the network administrator's demands.

Figure 3A:
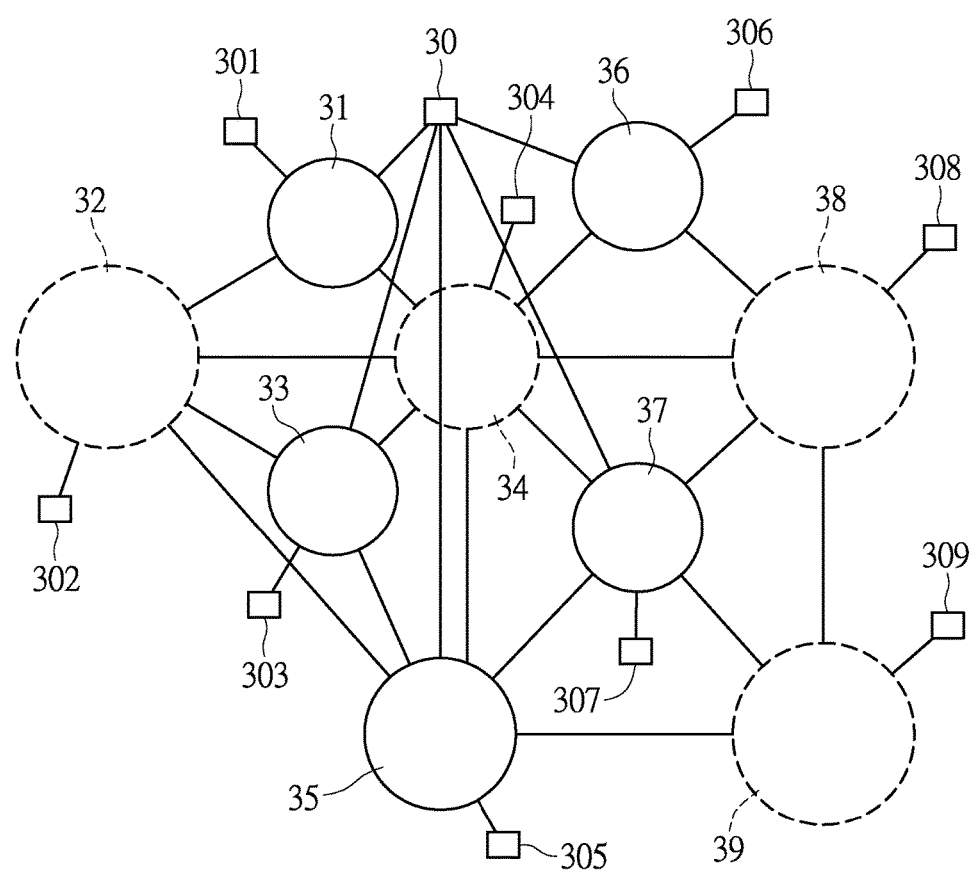
FIG. 3A shows a schematic diagram of a topology of the hybrid network.
Figure 3B:
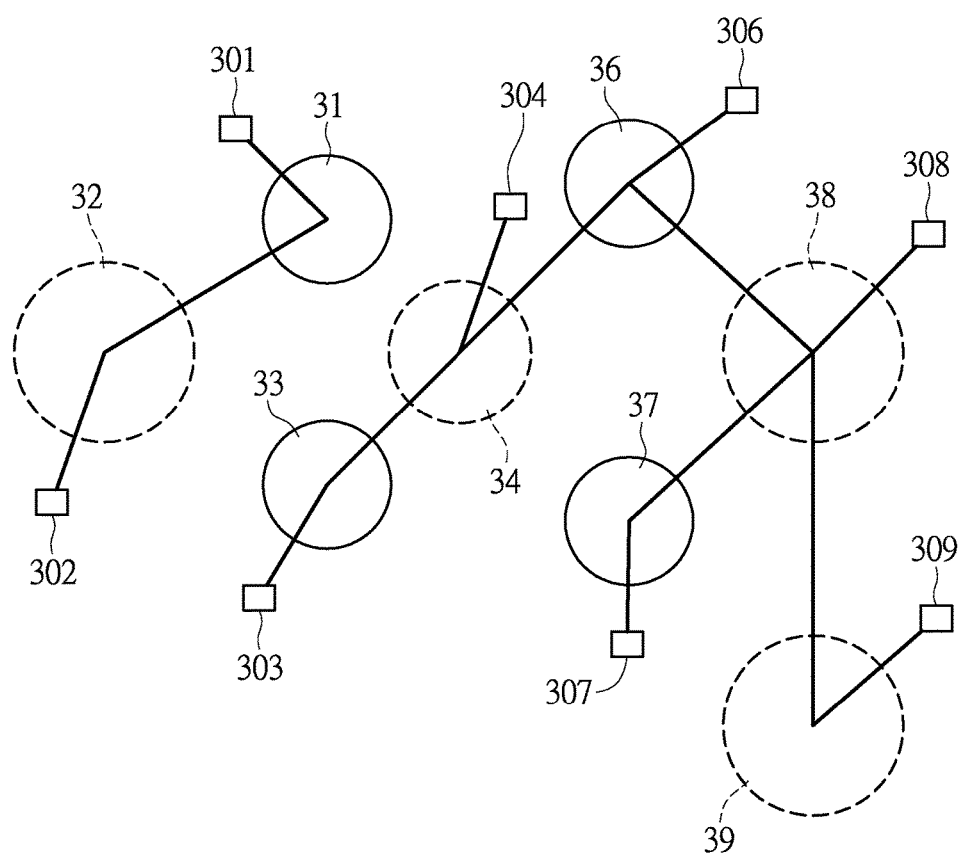
FIG. 3B shows a schematic diagram illustrating an exemplary spanning tree generated based on the topology of the hybrid network depicted in FIG. 3A.
Figure 3C:
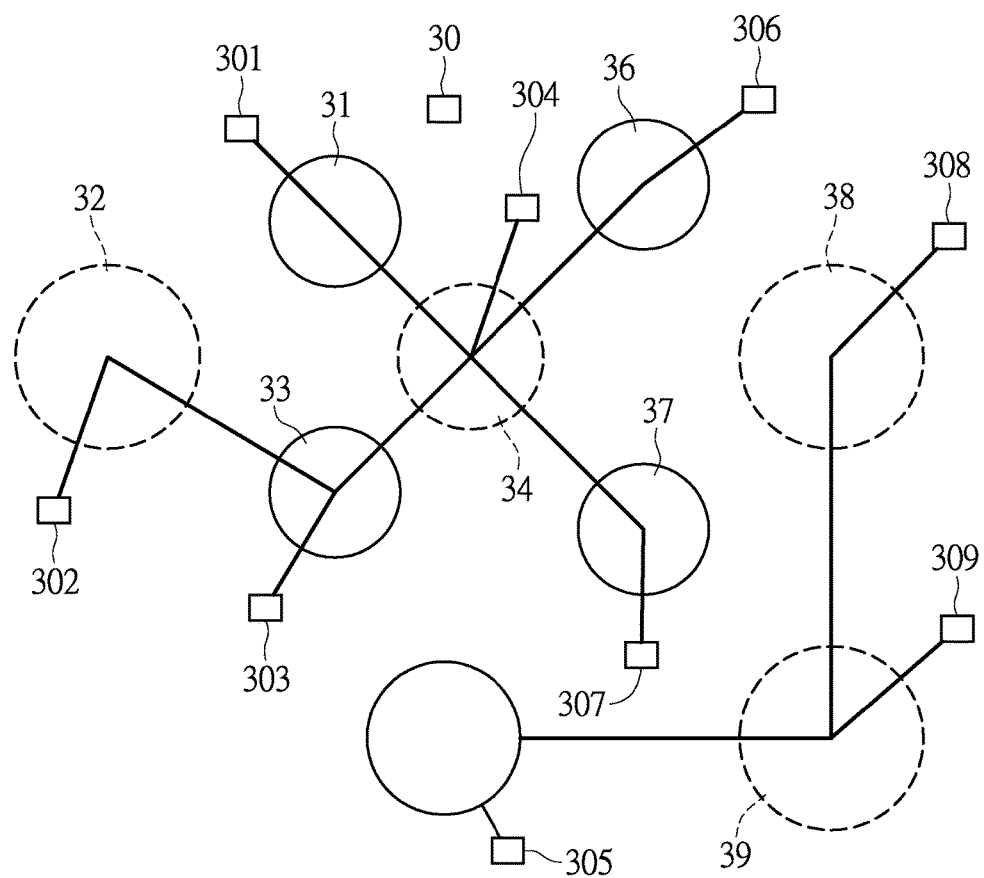
FIG. 3C shows a schematic diagram illustrating another exemplary spanning tree generated based on the topology of the hybrid network depicted in FIG. 3A.

References are then made to FIGS. 3A, 3B and 3C.

FIG. 3A shows a schematic diagram of a hybrid network system. Several software-defined networks 31, 33, 35, 36, and 37 are directly connected with a controller 30. The SDNs 31, 33, 35, 36, and 37 are also controlled under a centralized management mechanism using the controller 30. The controller 30 employs a communication protocol defined by an OpenFlow standard. The controller 30 separates the control plane of the node of network, e.g. switch, from its data plane. That means the controller 30 takes over the packet routing operation of the switch. The controller 30 manages the communication protocol between the controller 30 and the switch; computes the optimized route of the network; and controls data delivery of the switch through the OpenFlow standard.

FIG. 3A schematically shows the topology of a network system combining the SDNs 31, 33, 35, 36, and 37 represented by solid-line circles, and non-SDN traditional networks 32, 34, 38, and 39 represented by the dash-line circles. Every circle indicates a network section that includes multiple switches (not shown in the diagram). One or more connections may be used to link the adjacent network sections. In the diagram, all the solid-line-circled SDNs 31, 33, 35, 36, and 37 connect to the controller 30, which manages packets transferring among the SDNs and constructs spanning trees thereof. The network system mixes the SDNs with the dash-line-circled traditional networks 32, 34, 38, and 39.

Every network section has one or more terminal nodes. For example, the plurality of terminal nodes 301, 303, 305, 306 and 307 are the representative terminal nodes with respect to the SDNs 31, 33, 35, 36, and 37. Each of the traditional networks 32, 34, 38 and 39 has its representative terminal node, such as the shown nodes 302, 304, 308 and 309. As the network system operates, not only the controller 30 is in charge of processing packet transferring and path management among the nodes within the SDNs 31, 33, 35, 36, and 37, but also managing the spanning trees constructed among the heterogeneous networks under the mechanism of the method of the present invention.

While the hybrid network is in operation, every terminal node 301, 302, 303, 304, 305, 306, 307, 308, 309 generates its own network packets. Performance of delivering the packets at every node may be influenced by each other. In the method for constructing the hybrid network spanning trees of the present invention, several parameters are introduced to the network system for evaluating the spanning trees created under different conditions. At least the information of source and destination regarding the packets can be acquired from the packets collected from network. Through the information retrieved from the packets, the path bandwidth and path delay for the network system can be obtained. In particular, in the method, a computation of average path bandwidth and average path delay is required. References are made to FIG. 3B and FIG. 3C to indicate forming the spanning trees based on different information such as average path bandwidth and average path delay respectively.

In an exemplary example, based on an administrator's configuration, the spanning tree for a network system may be made based on a more balanced requirement of higher average path bandwidth and smaller average path delay. The related spanning tree as shown in FIG. 3B is such as the route arranged over multiple terminal nodes. It is noted that the diagram ignores the routing paths among the nodes within every network section.

Rather than FIG. 3B, the spanning tree shown in FIG. 3C requires different weights applied to the average path bandwidth and the average path delay. That means the construction of a spanning tree may only require higher average path bandwidth but ignore the average path delay. The spanning tree may also require smaller average path delay but without average path bandwidth requirement. Those requirements may be applied to various network systems. For example, the network system in charge of audio/video communication requires much smaller average path delay with high quality of network latency. Further, the network system with primary purpose of data transmission requires higher average path bandwidth since it uses high network bandwidth. Further, the network system may require balanced configuration of the average path delay and bandwidth since it provides comprehensive services. The flexibility of network system allows the administrator to tune ratio between the average path bandwidth and the average path delay, or their respective weights according to practical purpose.

The mentioned technology is to construct spanning trees among the heterogeneous networks according to the information relating to the path bandwidth and path delay in the network system. A control host of the hybrid network system is introduced to manage packet transferring over the whole network. The controller of SDN acts as the control host for managing the network system.

Figure 4:
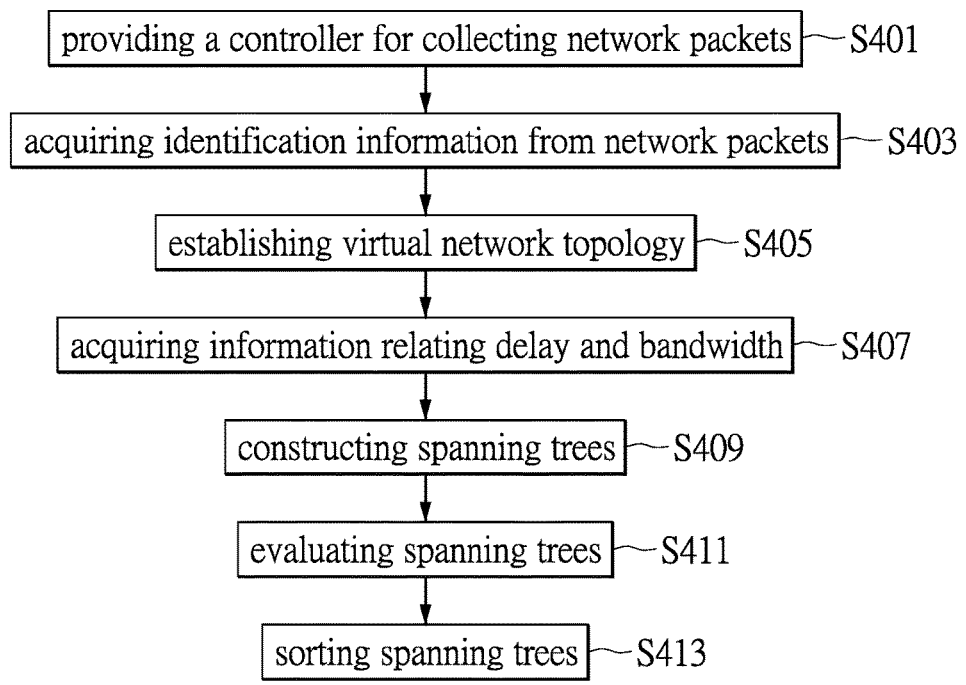
FIG. 4 shows a flow chart illustrating the method for constructing a spanning tree for a hybrid network in one embodiment of the present invention.

Reference is made to FIG. 4 showing a flow chart depicting the method for constructing the hybrid network spanning tree in one embodiment of the present invention.

At first, as in step S401, a controller is provided to act as the controller for the software-defined network. The controller is used to collect network packets from the network interfaces of the nodes within the network system periodically, for example, using a Link Layer Discovery Protocol (LLDP), such as in step S403. After inquiring identification information from the network packets, a topology of the whole network can be obtained. In step S405, the information for the whole network allows creating a virtual network topology.

The Link Layer Discovery Protocol (LLDP) is a protocol to establish network data link that allows the network equipment to acquire information of the adjacent equipment within the network system. The information is such as Internet Protocol address, and description of equipment and its functionality. In addition, the identification information with respect to the packets transmitted among the nodes is obtained, and also the other information such as delay and bandwidth related to the network can be obtained using the communication protocol operated in SDN, such as in step S407.

In an exemplary example, through OpenFlow command the controller of SDN can acquire the information relating to path delay and bandwidth over every link in SDN. For the traditional switches that are able to perform data transmission and instructions constituting the non-SDN, the controller of SDN retrieves the information regarding the traditional switches from the packets delivered to the switches of SDN using Bridge Protocol Data Unit (BPDU). These types of BPDU packets are the hello packets used by the spanning tree protocol. The BPDU packets are periodically delivered to exchange messages at the bridges within the network. The controller of SDN accordingly collects the information of traditional switches for constructing the spanning trees. The identification information such as Root ID with respect to BPDU packets can be retrieved for determining the connection status between all the SDNs and the non-SDNs. The BPDU packets allow the controller to receive the information between the network sections. The information between the network sections can be in combination with the topology information of SDN based on LLDP for resolving the whole topology for the hybrid network system.

Thus the controller of SDN is not only able to acquire information of path delay and bandwidth of SDN, but also acquire the information of network sections according to identification information resolved from BPDU packets. Next, in step S409, the information for the whole network system allows constructing spanning trees thereof.

The information with respect to the network section can be obtained from the identification information of BPDU packets. When the identification information from packets is determined as the same, the packets belong to the same network section. Therefore the controller of SDN can determine the connection status between the SDN and the non-SDN traditional network. Further, even though the controller of SDN is not allowed to explore the traditional network, the controller is still able to estimate connection status according to the path cost resolved from the BPDU packets. It is noted that the path cost of BPDU packets is used to estimate a path distance between the terminal node of the traditional network and the port of SDN switch receiving the BPDU packets. In the meantime, the controller periodically obtains information relating to the topology of the SDN under the Link Layer Discovery Protocol when the SDN switch explores the network topology under LLDP. The controller of SDN then computes the delay information as the packets are delivered over the traditional network using LLDP.

In the method, the information of connections among the heterogeneous networks is used to form the topology of the hybrid network, and accordingly construct all or part of possible spanning trees. The optimal spanning tree for the hybrid network system can be obtained by disabling the redundant routes. Further, a utility function is introduced to evaluate every spanning tree. Such as in step S411, the utility function is provided to compute a value corresponding to every spanning tree. The all or part of spanning trees can be sorted according to their corresponding values, such as in step S413. The optimal spanning tree is therefore obtained. Based on this rank, a redundancy for the spanning trees for the hybrid network system is achieved, one of the objectives of the present invention.

The utility function is described as follows. All the spanning trees for the topology of the network system are computed by an algorithm in the SDN controller. A conventional spanning tree protocol, e.g. a data-link layer communication protocol (the second layer) under an Open System Interconnection (OSI) network model, may be used to construct the spanning tree. The spanning tree guarantees that the network system has no loop to form the packet broadcast storm. Further, the algorithm performed in the SDN controller gives every spanning tree a corresponding value. The value is computed by referring to the numerical parameters such as the average path delay and/or average path bandwidth. The parameters are such as the path delay and path bandwidth over the route of the hybrid network using the OpenFlow protocol and BPDU packets. Thus every spanning tree can be evaluated according to one of or both the path delay and path bandwidth. It is noted that a conversion, e.g. normalization, may be applied to the two numerical values to be under the same grade since they have difference ranges of values.

For example, when the highest value of the average path bandwidth is set to 100 and the lowest value thereof is set to 0, the remaining values are calculated proportionally. The calculation allows every numerical value of the path bandwidth to be in between 0 to 100. Similarly, the lowest value of the average path delay is set to 100, and the highest value thereof is set to 0. The remaining values are calculated proportionally. Therefore every spanning tree can be evaluated by applying the two types of numerical values within 0 to 100. The spanning tree can be graded using the average path delay and average path bandwidth.

In addition, it is to weigh the average path delay and the average path bandwidth for every spanning tree according to one of the embodiments of the present invention. It is thereby to configure relative emphasis degrees of performance indexes respectively for the average path delay and the average path bandwidth for every spanning tree. Noted that the administrator can set the weighting to the numerical values via a management interface. In one embodiment, the administrator is allowed to set parameters to the SDN controller via an API, the application program interface. The approach allows the administrator to set a weight ratio. For example, 'x %' indicates a weight ratio; the utility function is formulated as (x %*grade of average path delay)+((100−x) %*grade of average path bandwidth). The highest score of the utility function in a rank derives an optimal spanning tree.

Figure 5:
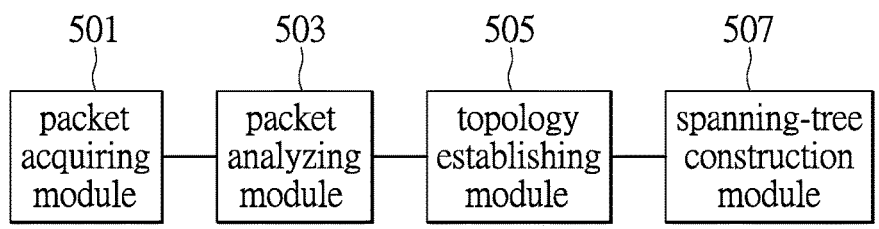
FIG. 5 shows a diagram illustrating function modules of the control system for constructing spanning trees for the hybrid network according to one of the embodiments of the present invention.

Reference is next made to FIG. 5 depicting the main function modules of the control system for implementing the method for constructing hybrid network spanning trees in accordance with the present invention. Those function modules may be implemented by software, firmware, or hardware. The function module is such as a packet acquiring module 501 which is used to collect network packets from SDN and non-SDN tradition network. The collected packets are resolved by a packet analyzing module 503 for acquiring at least the identification information and path information. Based on the identification information in the network packets, the information relating to topology for the hybrid network system can be obtained. The function module is such as a topology establishing module 505 used to establish the topology of the hybrid network according to the information obtained through the identification information resolved by the packet analyzing module. The information also allows estimating the path delay and bandwidth. The function module is such as a spanning-tree construction module 507 used to construct all or part of spanning trees for the hybrid network according to an average path delay and an average path bandwidth for every path estimated from the path information. A value with respect to every spanning tree is obtained.

Figure 6:
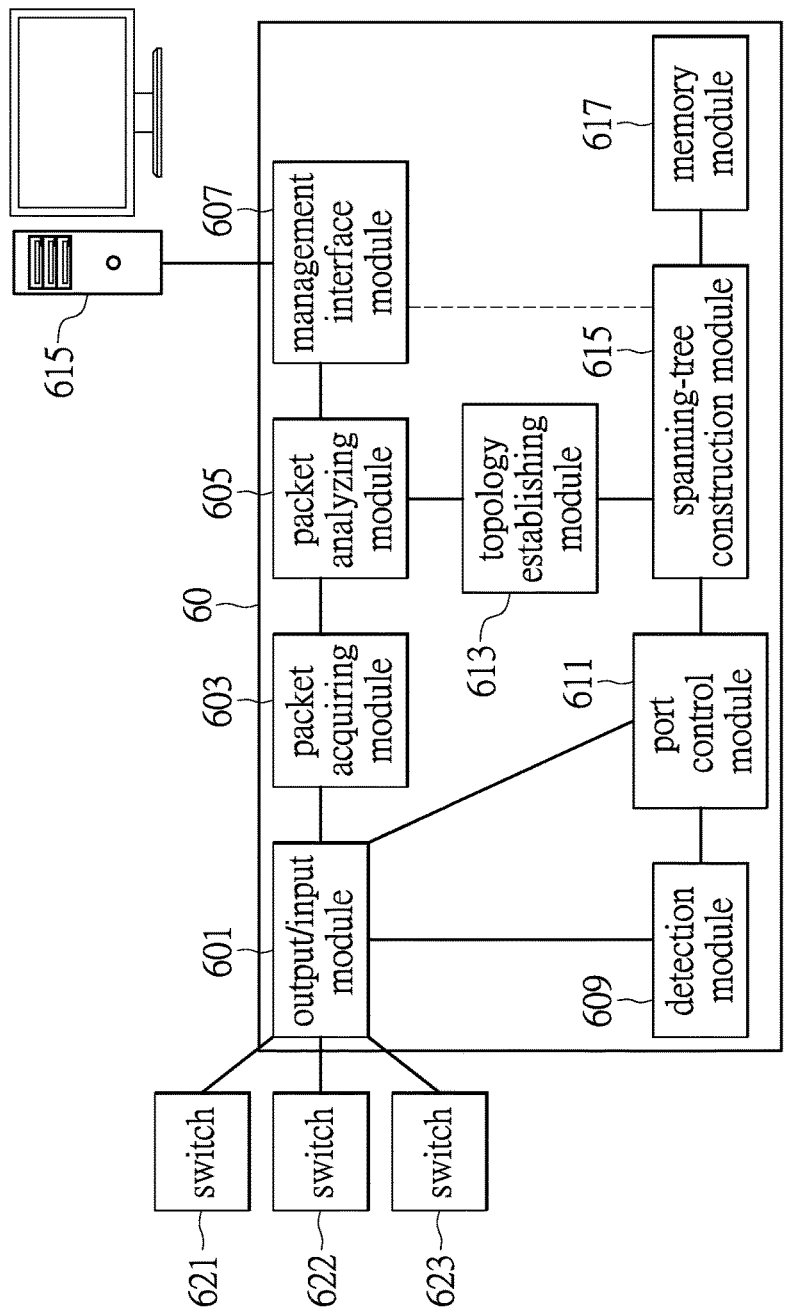
FIG. 6 shows another diagram illustrating function modules of the control system for constructing spanning trees for the hybrid network according to one further embodiments of the present invention.

FIG. 6 shows another schematic diagram describing the function module of the control system according to one of the embodiments.

The controller 60 indicates the SDN controller including the software, firmware, or hardware-implemented function modules. An output/input module 601 is used to connect with switches 621, 622, 623. A packet acquiring module 603 is used to collect packets from the switches 621, 622, 623 located at the border between the network sections. The packet acquiring module 603 collects the packets from at least one SDN and the BPDU packets from at least one non-SDN. A packet analyzing module 605 is provided to resolve the information of network packets, such as root ID. The identification retrieved from the packets allows the system to get the topology after exploring the whole network system. Further, a topology establishing module 613 is used to create a virtual topology that allows a spanning-tree construction module 615 to construct spanning tree(s) over the topology, especially all possible spanning trees for the whole network system that can be constructed. The information relating to the topology can be temporarily buffered in a memory module 617. The memory module 617 is used to record the information relating to the topology, spanning tree, and delay and bandwidth over every route. The information regarding the construction of spanning tree is associated with the average path delay, the average path bandwidth, and the related weights. The information may also be used to compute the value with respect to every spanning tree. The corresponding value is the basis to sort the spanning trees and obtain the optimal spanning tree.

When the network system operates under a specific spanning tree, a port control module 611 of the SDN controller is used to conduct port control according to path information of the spanning tree. When a specific spanning tree is in operation, one or more ports may be specified to be disabled. The controller 60 is able to manage the port of a node of SDN, and thereby disabling redundant network routes for preventing loops. The controller 60 has a management interface module 607 which is provided for an administrator to manage the channel to the controller 60 and the control system thereof using a management computer 615. The administrator can set weights to the spanning trees through the spanning-tree construction module 615.

Because the network may meet some accidents such as line fault resulting in breaking communication, the method of the present invention renders a mechanism of redundancy. For example, the SDN controller periodically detects change of the network topology, and prepares one or more backup spanning trees ready for redundancy. The backup spanning tree replaces the current spanning tree once the network connection is broken or in congestion. In an exemplary example, the currently-used spanning tree topology can be rapidly switched to one backup optimal spanning tree once any line faults.

Figure 8:
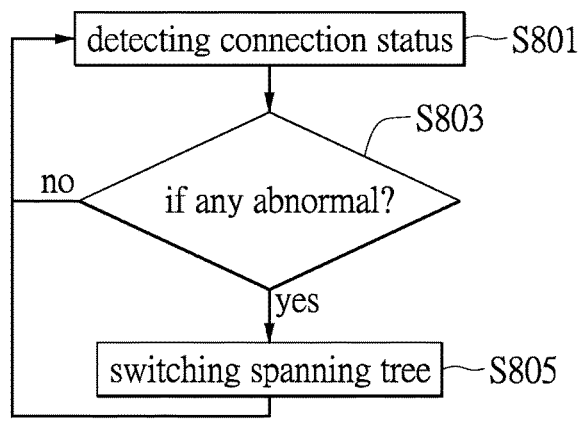
FIG. 8 shows a flow chart depicting the method of redundancy for the hybrid network incorporating the method for constructing spanning trees in one embodiment of the present invention.

In an exemplary example, the controller 60 has a detection module 609 which is used to detect any abnormal connection in the network system from the packets retrieved by the packet acquiring module 603. In the meantime, the method of redundancy using the hybrid network spanning tree is utilized to cure the fault caused by the abnormal connection. Reference is made to FIG. 8 showing a flow chart describing the method for constructing hybrid network spanning trees.

Firstly, in the method, the path information carried with the network packets can be used to detect the connection status, e.g. path delay, bandwidth, and any broken route (step S801). In step S803, it detects if any abnormal condition exists within the network system. In an exemplary example, the records in the memory module 617 or other storage medium, or a threshold set are used to determine if the path bandwidth is too small, the path delay is too long, or any change of the connection. The step of detection goes on, as shown in step S801, when the detection result is within a normal range as compared with the history records or a threshold. Otherwise, if any abnormal condition is found, e.g. broken connection, such as in step S805, a backup spanning tree is switched on according to the rank as evaluated based on the values of the spanning trees. It is noted that the detection process is performed periodically or constantly.

Figure 7:
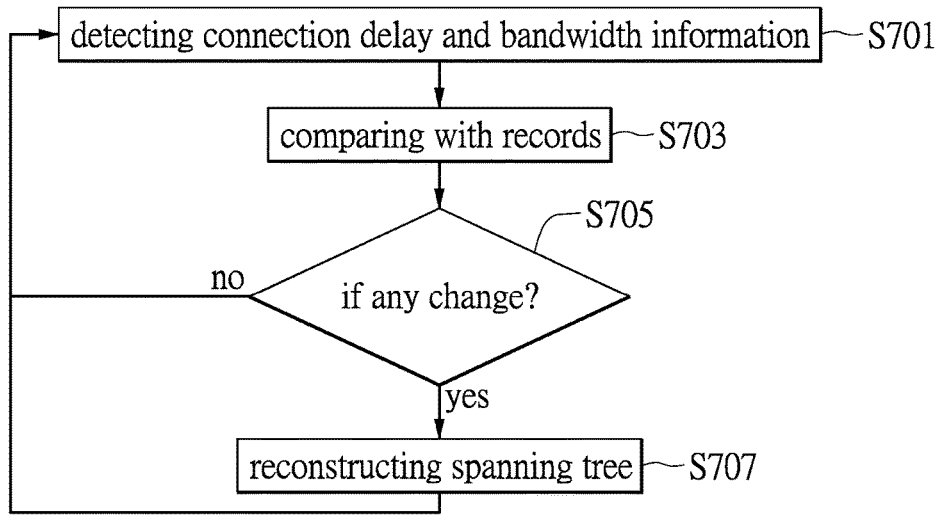
FIG. 7 shows a flow chart depicting the method for reconstructing the spanning trees for the hybrid network in one embodiment of the present invention.

Moreover, the controller 60 performs the method of constructing spanning trees according to the path delay and path bandwidth, as referring to the flow chart in FIG. 7.

In step S701, the detection module 609 of the controller 60 is used to detect the path delay and bandwidth. The detection result is compared with the records in the memory module 607 or storage medium, as shown in step S703. The controller 60 then determines if any change occurs to the average path delay or average path bandwidth within the network, as shown in step S705. The current spanning tree is still in operation when there is no change detected. The detection also continues. Otherwise, in step S707, the system will ask for re-constructing the spanning tree for maintaining the system operating using the optimal spanning tree.

Thus, disclosure in accordance with present invention is related to a method for constructing hybrid network spanning trees, a method of redundancy, and a control system. The SDN controller is especially incorporated to implement the method and used to integrate the network messages over SDN and the other network connected to SDN. The loops among the heterogeneous networks can be avoided when removing the redundant network connections, so as to avoid the packet broadcast storm problem. The spanning trees among the nodes over the heterogeneous networks are constructed by referring to the parameters such as the path delay and path bandwidth. An optimal spanning tree can be created over the hybrid networks composed of the SDN and the traditional networks, and therefore constructing the spanning trees over the hybrid network without any modification of the current systems and the traditional switches.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for constructing spanning trees over a hybrid network, applied to the hybrid network established by combining at least one Software-Defined Network and at least one non-Software-Defined Network, comprising:
   providing a controller used to collect network packets from the at least one Software-Defined Network and from the at least one non-Software-Defined Network; wherein each of the at least one Software-Defined Network includes at least one node which is connected with at least one node in the at least one non-Software-Defined Network;
   by resolving identification information from the network packets, acquiring information of a topology of the hybrid network, so as to establish a virtual network topology;
   retrieving information relating to path delay and path bandwidth of the at least one Software-Defined Network and the at least one non-Software-Defined Network;
   constructing all or part of spanning trees for the hybrid network, in which every spanning tree is attributed to have an average path delay and an average path bandwidth, and accordingly with a corresponding value.

2. The method according to claim 1, wherein the controller originally operates for the at least one Software-Defined Network.

3. The method according to claim 2, wherein the at least one Software-Defined Network utilizes an OpenFlow protocol to retrieve information relating to path delay and path bandwidth for every path for the at least one Software-Defined Network.

4. The method according to claim 2, wherein the controller periodically obtains information relating to the topology of the at least one Software-Defined Network under a Link Layer Discovery Protocol.

5. The method according to claim 4, wherein the controller of the at least one Software-Defined Network collects network Bridge Protocol Data Unit packets sent by traditional switches to a switch of the at least one Software-Defined Network, and resolves identification information, so as to determine connection conditions between the at least one Software-Defined Networks and the at least one non-Software-Defined Networks; in combination with the topology information of the at least one Software-Defined Network obtained by the controller through the Link Layer Discovery Protocol, information relating to the topology of the whole hybrid network system.

6. The method according to claim 5, wherein, a path distance between a terminal node within the at least one non-Software-Defined Network and a port of the switch of the at least one Software-Defined Network is estimated, wherein the path distance of non-Software-Defined Network is estimated according to a path cost analyzed from network packets of the Bridge Protocol Data Unit.

7. The method according to claim 1, further comprising sorting the spanning trees based on the value corresponding to every spanning tree, so as to obtain an optimal spanning tree.

8. The method according to claim 7, further comprising weighting the average path delay and the average path bandwidth for every spanning tree, so as to configure relative emphasis degrees of performance indexes respectively for the average path delay and the average path bandwidth.

9. A method of redundancy for hybrid network spanning trees, adapted to a hybrid network integrating at least one Software-Defined Network and at least one non-Software-Defined Network, comprising:
   utilizing the method for constructing spanning trees for the hybrid network to construct all or part of spanning trees for the hybrid network; wherein corresponding value of every spanning tree is obtained according to an average path delay and an average path bandwidth, and sorting the all or part of spanning trees; and switching to a next spanning tree when any abnormal condition is detected from received network packets.

10. The method of redundancy according to claim 9, further comprising determining if a path bandwidth is too small, too long delay, or is broken according to path information carried by the network packets.

11. The method of redundancy according to claim 9, further comprising weighting the average path delay and the average path bandwidth for every spanning tree, so as to configure relative emphasis degrees of performance indexes respectively for the average path delay and the average path bandwidth.

12. A control system implemented by software, firmware, or hardware for hybrid network spanning trees for performing steps comprising:

collecting network packets from at least one Software-Defined Network and at least one non-Software-Defined Network; wherein each of the at least one Software-Defined Network includes at least one node which is connected with at least one node of the at least one non-Software-Defined Network;

resolving identification information and path information from the network packets collected by the packet acquiring module;

establishing a topology of the hybrid network according to information of the topology obtained through the identification information resolved by the packet analyzing module; and constructing all or part of spanning trees for the hybrid network according to an average path delay and an average path bandwidth for every path estimated from the path information, so as to obtain a value with respect to every spanning tree.

13. The system according to claim 12, further comprising connecting to at least one switch of the at least one Software-Defined Network.

14. The system according to claim 12, further comprising conducting port control according to the path information of the spanning tree when the hybrid network operates under one of the spanning trees.

15. The system according to claim 12, further comprising a management interface provided for an administrator to manage the control system using a management computer.

* * * * *